United States Patent [19]

Buck et al.

[11] Patent Number: 4,624,562

[45] Date of Patent: Nov. 25, 1986

[54] SIGNAL GENERATOR FOR ALIGNING OPTICAL FIBERS

[75] Inventors: John S. Buck, Widnes; David Owens, Farnworth, Nr. Widnes, both of England

[73] Assignee: BICC Public Limited Company, London, England

[21] Appl. No.: 719,710

[22] Filed: Apr. 4, 1985

[30] Foreign Application Priority Data

Apr. 5, 1984 [GB] United Kingdom ............... 8408824

[51] Int. Cl.$^4$ .......................................... G01N 21/00
[52] U.S. Cl. ................................................ 356/73.1
[58] Field of Search ............ 356/73.1, 138, 153, 356/432, 433, 434; 350/96.15, 96.18, 96.2, 96.21, 96.22; 370/1, 3; 455/600, 612, 618

[56] References Cited

U.S. PATENT DOCUMENTS 3,800,388  4/1974  Borner et al. ............... 356/73.1 X
4,391,517  7/1983  Zucker et al. ............... 356/434 X
4,545,643  10/1985 Young et al. ............... 350/96.21 X

*Primary Examiner*—Eugene R. LaRoche
*Assistant Examiner*—D. Mis
*Attorney, Agent, or Firm*—Anthony J. Casella; Gerald E. Hespos

[57] ABSTRACT

A signal generator which can inject an optical signal into all the fibers of a cable, and so be left unmanned during jointing operations, uses a tungsten-halogen or other incandescent light source. This is collimated by conventional optical elements and pulsed by a mechanical chopper. All the fiber ends are aligned with and positioned within the chopped collimated beam.

7 Claims, 2 Drawing Figures

SIGNAL GENERATOR FOR ALIGNING OPTICAL FIBERS

This invention relates to signal generators for use in testing optical fibers and cables incorporating them, especially, but not exclusively, in the course of installation or maintenance. Such signal generators inject into an optical fiber or cable a pulsed optical signal of appropriate wave number and pulse frequency that can be detected at the opposite end of the optical fiber or cable to check correct functioning and in particular, to verify, and possibly to assist in obtaining, correct alignment of the ends of optical fibers in splices and joints.

Signal generators currently in use are based on a light-emitting diode which is closely coupled to one optical fiber. When, for example, a cable comprising ten optical fibres is being installed, the signal generator needs to be transferred from optical fiber to optical fiber as each in turn is spliced or jointed to an optical fiber of a second cable length, and this procedure must be repeated for every subsequent cable joint. As a consequence, not only must the signal generator be manned continually but also communication must be provided between the signal generator and each cable jointing position. It would be prohibitively expensive to use a separate signal generator for each fiber.

The present invention provides an improved signal generator, of comparable cost to those currently in use, which will inject a signal simultaneously into a multiplicity of optical fibers, for example all those of a cable, and which can thus be installed and, in favourable circumstances, left running, unmanned and without requiring adjustment, while the whole splicing or jointing process is carried out.

According to the invention, the improved signal generator comprises an incandescent light source; at least one optical element for deriving from the source a light beam which will extend in a substantially rectilinear direction; means for aligning ends of a plurality of optical fibers with the direction of the beam and positioning them within the area of the beam; and means for interrupting the beam at a substantially constant frequency to inject simultaneously a pulsed optical signal into all the said optical fibers.

The incandescent light source is preferably an electric tungsten-halogen lamp of high intensity, but, in some circumstances, incandescent gas lamps, arc lamps or other such sources can be used.

The optical element for each optical element may be any suitable lens, mirror or combination of either or both, provided that any lenses are transparent at the wavenumber to which the detector to be used will respond, normally the signal wavenumber for which the optical fiber system is designed.

The fiber end aligning means may be of any known kind, for example a drilled metal block with tubular plastics inserts; preferably it is adjustable in two directions normal to each other and to the optical axis of the incandescent light source to allow optimising of alignment.

The means for interrupting the beam at a substantially constant frequency is preferably a mechanical chopping device such as a rotatable slotted or notched disc driven by an electric motor in known manner; a high-precision speed control will normally be required to establish a constant pulse frequency within the required bandwidth. In some circumstances, the beam interrupting means may be an electric device.

The invention is further illustrated by a description, by way of example, of a preferred signal generator and of a preferred method of aligning optical fibers to be spliced with reference to the accompanying drawings, in which.

Figure 1:
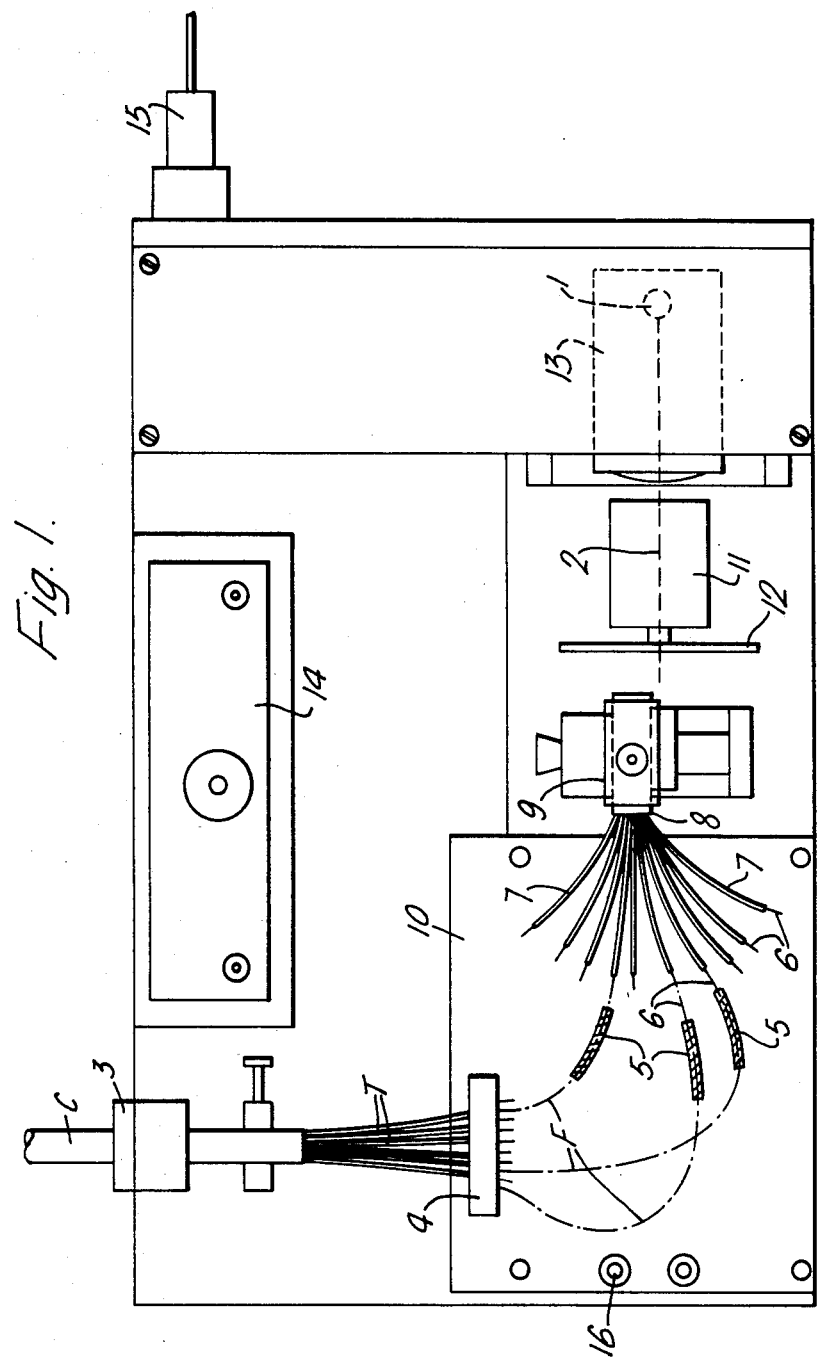
FIG. 1 is a plan view of the preferred signal generator.

Referring to FIG. 1, the preferred signal generator comprises a tungsten-halogen projection bulb 1 fitted in an optical assembly 13 for interrupting a conventional reflector and two condenser lenses located to give a narrow beam of light along a rectilinear optical axis 2. No heat filter is used as the generator is required to function at a wavenumber in the infra red region.

A cable C comprising ten plastics tubes T each loosely housing an optical fiber F into which a signal is to be injected enters the signal generator through a gland 3 and is clamped and stripped back in a manner appropriate to its design to expose the individual optical fibers, the plastics tubes being held by a holder 4. The optical fibers F are individually trimmed using a conventional optical fiber cutting tool and a disconnectable optical fiber joint 5 is effected between each optical fiber F and one of ten optical fiber tails 6, (for clarity only three joints 5 being shown) each loosely housed in a protective plastics tube 7 protruding from an aluminum sleeve 8 in the bore of which the optical fiber tails are permanently encapsulated in resin. The other ends of all of the optical fiber tails 6 lie substantially flush with the end face of the aluminium sleeve 8, the end faces of the sleeve and of the optical fiber tails being polished. The aluminium sleeve 8 is detachably secured in an aluminium alignment block 9 with the polished end faces of the optical fiber tails 6 nearer the optical assembly 13. The disconnectable optical fiber joints 5 are clamped to a table 10 by magnetic clamps. The core of each of the optical fiber tails 6 has a diameter substantially greater than that of the core of each of the optical fibers F.

The block 9 is independently adjustable in two rectilinear directions normal to one another and each normal to the optical axis 2 to enable the block to be aligned as precisely as possible to bring the polished end faces of all of the optical fiber tails 6 within the area of maximum intensity of the light beam from the bulb 1. An electric motor 11, located below the optical axis 2, drives a slotted chopping disc 12 of conventional design. A speed controller 14 regulates the motor to obtain a chopping (pulse) frequency of 2048±5 Hz and is fed through a power inlet 15. The generator is controlled by an on/off switch 16.

Figure 2:
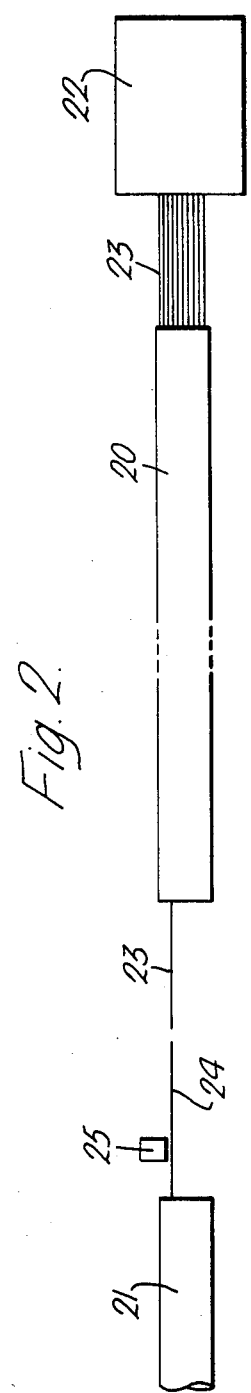
FIG. 2 is a schematic representation of the preferred method of aligning optical fibers to be spliced.

In using the signal generator shown in FIG. 1 in aligning and splicing the optical fibers of two lengths of optical cable, each several hundreds of meters in length, as will be seen on referring to FIG. 2, the signal generator 22 is positioned at one end of a cable 20 whose optical fibers are to be spliced to optical fibers of a cable 21. The optical fibers 23 of the cable 20 are connected into the signal generator in a manner described within reference to FIG. 1 and a beam of incandescent light interrupted at a substantially constant frequency is injected simultaneously into all the optical fibres 23. At the splicing position intermediate the neighbouring ends of the cables 20 and 21, an optical fibre 23 of the cable 20 is approximately aligned with an optical fiber 24 of the cable 21 and light transmitted into the optical fiber 24 is detected by a detecting device 25. One or each of the optical fibers 23, 24 is moved transversely with respect to the other until the light detected by the detecting device 25 is a maximum and a fusion splice between the two optical fibers is then effected. Each of the other optical fibers 23 of the optical cable 20 in turn is aligned with and fusion spliced to an optical fiber 24 of the cable 21 in the same manner without the necessity of adjusting the signal generator 22 in any way.

What we claim as our invention is:

1. A signal generator for injecting a signal simultaneously into a multiplicity of optical fibers comprising an incandescent light source; at least one optical element for deriving from the source a light beam which will extend in a substantially rectilinear direction; means for aligning ends of a plurality of optical fibers with the direction of the beam and positioning them within the area of the beam; means for interrupting the beam at a substantially constant frequency to injet simultaneously a pulsed optical signal into all the said optical fibers.

2. A signal generator is claimed in claim 1, wherein the incandescent light source is an electric tungsten-halogen lamp of high intensity.

3. A signal generator as claimed in claim 1, wherein said at least one optical element comprises at least one lens.

4. A signal generator as claimed in claim one wherein the fiber and the aligning means is adjustable in two directions normal to one another and to the optical axis of the incandescent light source.

5. A signal generator as claimed in claim 4, wherein the fiber end aligning means comprises a metal block in which can be detachably clamped a metal sleeve in the bore of which a plurality of optical fiber tails are permanently encapsulated in resin, at one end of the sleeve the end faces of the sleeve and of the optical fiber tails lying in a common substantially radial plane and being polished and, at the other end of the sleeve, the optical fiber tails protruding from the sleeve for detachable connection to optical fibers of a cable to be tested.

6. A signal generator as claimed in claim 1, wherein the means for interrupting the beam at a substantially constant frequency is a mechanical chopping device.

7. A signal generator is claimed in claim 6, wherein the mechanical chopping device is a rotatable slotted disc driven by an electric motor.

* * * * *